No. 628,059. Patented July 4, 1899.
R. R. WISE.
BICYCLE BRAKE.
(Application filed Sept. 21, 1898.)
(No Model.)
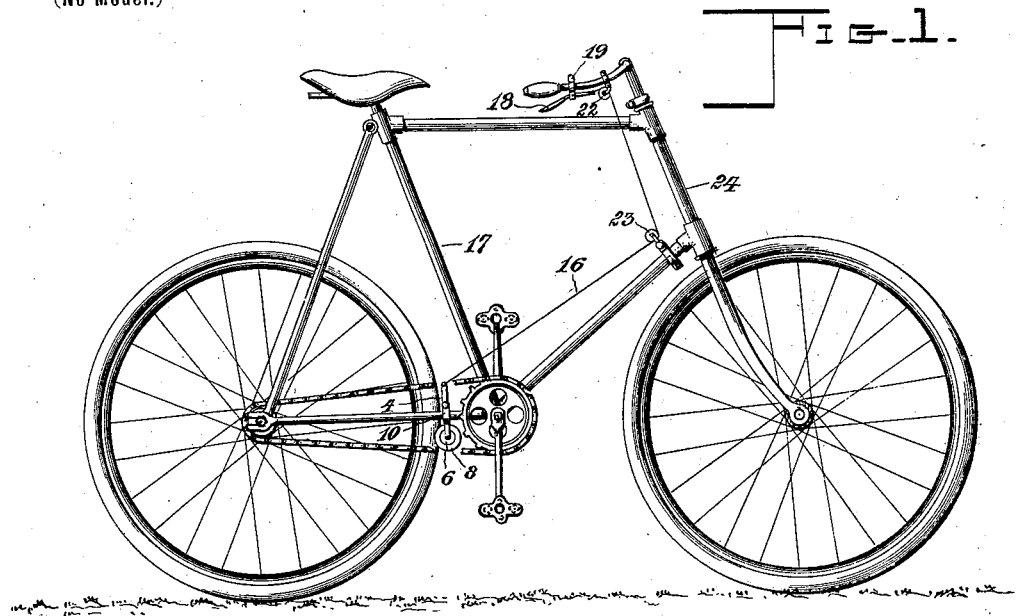
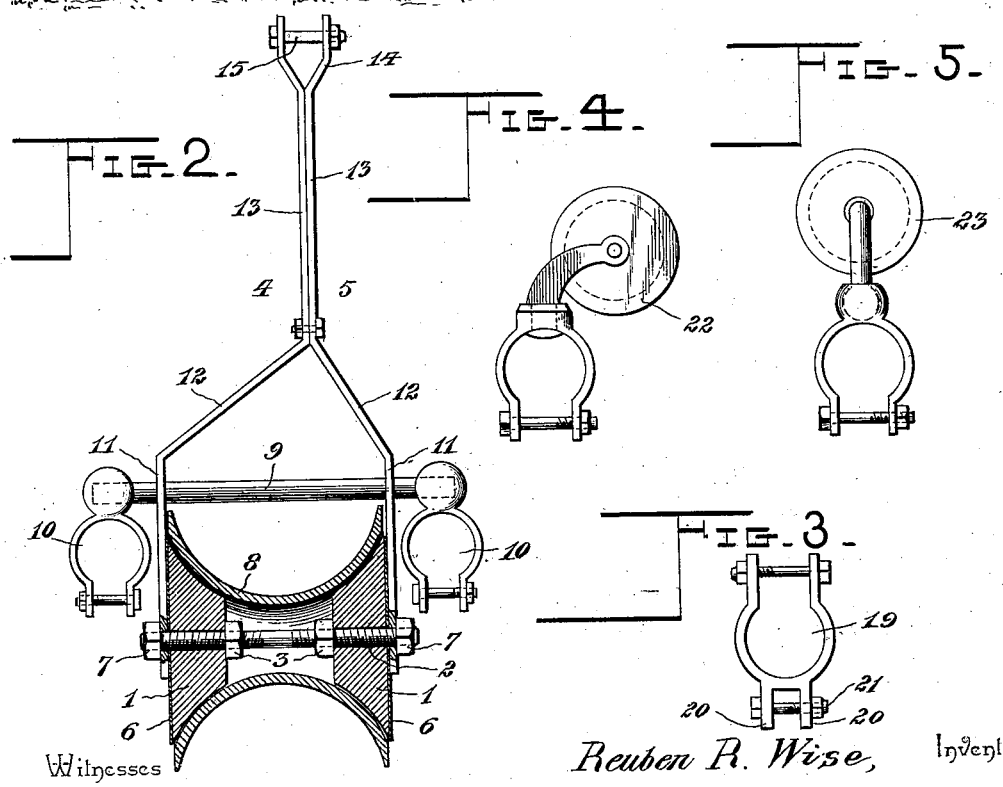
Witnesses
John F. Beauchuniel
H. E. Shepard
Reuben R. Wise, Inventor
By his Attorneys.
C. A. Snow & Co.
THE NORRIS PETERS CO., PHOTO-LITHO., WASHINGTON, D. C.

UNITED STATES PATENT OFFICE.

REUBEN REYNIE WISE, OF SEBEWAING, MICHIGAN.

BICYCLE-BRAKE.

SPECIFICATION forming part of Letters Patent No. 628,059, dated July 4, 1899.

Application filed September 21, 1898. Serial No. 691,524. (No model.)

*To all whom it may concern:*

Be it known that I, REUBEN REYNIE WISE, a citizen of the United States, residing at Sebewaing, in the county of Huron and State of Michigan, have invented a new and useful Bicycle-Brake, of which the following is a specification.

This invention relates to brakes, and more particularly to that class of brakes used upon rubber and pneumatic tires, such as are employed upon bicycle-wheels and the like.

The object of the present invention is to provide a brake-shoe which while it will revolve during its contact with the tire yet will have means to retard its movement, thereby applying the brake in a manner not to wear or damage the tire, as is the case with the ordinary "spoon-brake."

To this end the invention consists in the novel construction and arrangement of the several parts, all of which will be hereinafter more fully described, shown in the drawings, and particularly pointed out in the claims.

In the drawings, Figure 1 is a side elevation of a bicycle having my improved brake applied thereto. Fig. 2 is a side elevation of the frame, the core and shell being shown in section. Fig. 3 is a detail perspective view of the clamp in which the operating-lever is mounted. Fig. 4 is a detail view of the clamp and caster-pulley for the operating-cord. Fig. 5 is a similar view of the clamp and pulley having the universal joint.

Similar numerals of reference indicate corresponding parts in all the figures of the drawings.

Referring to the drawings, and particularly to Fig. 2 thereof, 1 designates a pair of frusto cones which are mounted upon a threaded rod 2. These cones may be adjusted longitudinally upon the threaded rod and are held in their adjusted position by means of the nuts 3. These nuts are arranged between the two cones and form stops against an inward movement thereof. The rod 2 is supported at its ends in a pair of oppositely-arranged levers 4 and 5, which form a frame for hanging the device. Washers 6 are interposed between the outer ends of the cones 1 and the inner faces of levers 4 and 5, and nuts 7 are placed upon the protruding ends of rod 2, whereby each cone is firmly clamped between the respective nuts 3 and the ends of the levers 4 and 5 to hold the same stationary and prevent them from revolving upon the rod 2. The cones are incased within a shell 8, which is open at each end, being of the same curvature and fitting evenly the periphery of the cones, so as to turn thereon.

It will be understood that the rod 2 and the cone 1 rigidly secured thereto form a stationary core upon which the shell 8 revolves, and when the shell is brought into contact with the tire of a wheel said shell is revolved; but the stationary core retards the movement thereof, whereby the brake is applied, so as not to damage the tire by scraping, as is the case with the ordinary spoon-brake. The brake-spool thus constructed when used upon a bicycle is preferably mounted upon the lower rear forks thereof just in advance of the rear wheel and between it and the crank-hanger, as shown in Fig. 1. The frame formed by the levers 4 and 5 is provided with a transverse bar 9, having its ends projecting beyond the frame at each side thereof and journaled in suitable clamps 10, provided upon each of the members of the rear fork. Each of the levers 4 and 5 is formed from a flat strap of metal to provide the frame having the straight parallel sides 11, between which the brake-spool is mounted, the converging arms 12, and the contacting straight arms 13. The arms 13 are forked at their upper ends, as at 14, and a pin 15 extends across the forked portion, to which the operating-cord 16 is attached. The straight arms formed by the arms 13 are offset or arranged to one side of the longitudinal axis of the frame, so as to work at one side of the upright bar 17 of the bicycle-frame.

The means for operating the device to throw the spool in contact with the tire comprises a lever 18, pivoted to a clamp 19, which is secured upon the handle-bar, so as to dispose the lever directly underneath the grip in easy reach of the rider. The form of this clamp is shown in Fig. 3, having a pair of ears 20, between which the lever is pivoted intermediate its ends by means of a suitable pin or bolt 21. This lever is preferably of the form shown, having the two arms arranged at an obtuse angle. The cord 16 is connected to the inner end of lever 18 and passes over a grooved pulley-wheel 22, arranged upon the handle-bar in advance of the lever, then it passes downward to a similar pulley-wheel 23, mounted upon the lower bar of the bicycle-frame, near the head 24 thereof, and thence to the arm 13 of the frame carrying the brake-spool. The pulley-wheel 22 is connected to its clamp in a manner similar to the ordinary caster, so as to turn in a horizontal plane with the handle-bar, as indicated in Fig. 4, and the pulley 23 has a universal joint with its clamp, as indicated in Fig. 5, so as to preserve the relation of the pulleys and prevent the cord from slipping therefrom.

The frame for carrying the brake-spool is mounted with the spool depending beneath the rear fork of the bicycle and out of contact with the tire and with the arm 13 extending upward. By grasping the lever 18 and pressing it upward its other end is depressed, drawing the cord 16 with it, which draws the arm 13 of the spool-frame forward and presses the shell of the spool firmly against the tire upon the transverse bar 9, journaled in the clamps 10, as a pivot. When the pressure is released, the frame will resume its normal position by reason of gravity.

The ends of the shell 8 do not touch the side arms 11 of the frame, but are spaced away therefrom, and the shell revolves freely between them. The ends of the cones 1 extend beyond the ends of the shell, so as to permit of an inward adjustment to vary the frictional engagement with the shell and to take up wear.

Changes in the form, proportion, and minor details may be made without departing from the spirit and scope or sacrificing any of the advantages of my invention, and therefore I do not wish to be understood as limiting myself to the precise construction and arrangement as herein set forth.

Having thus described my invention, what I claim is—

1. In a brake, the combination with a shaft, of a pair of cones adjustably carried upon said shaft, two pairs of devices movable on the shaft, the respective members of the pairs being located respectively at opposite sides of and in engagement with the cones, thereby to lock the latter against movement longitudinally of the shaft, and a shell incasing said cones.

2. In a brake, the combination with a shaft screw-threaded at its opposite ends, of two cones in threaded engagement with the shaft, two pairs of nuts movable on said shaft, and the respective nuts of the pairs being located at opposite sides of and in engagement with the cones, thereby to prevent movement of said cones longitudinally of the shaft, and a shell incasing and revoluble on the cones.

3. In a brake, the combination with a threaded shaft, of two cones on the ends of the shaft, two pairs of nuts movable on the shaft and located at opposite sides of and in engagement with the cones, thereby to normally prevent movement yet permit the adjustment of said cones on the shaft, and a one-piece shell incasing the cones and having a continuous unbroken surface which is curved in cross-section and of less diameter at its center than that of the smaller end of either cone, as and for the purpose set forth.

In testimony that I claim the foregoing as my own I have hereto affixed my signature in the presence of two witnesses.

REUBEN REYNIE WISE.

Witnesses:
EMMA BACH,
RICHARD MARTINI.